Aug. 8, 1939　　　L. HAWKINS　　　2,169,144
COMBINED CAGE AND FEEDER STRUCTURE FOR POULTRY
Filed Jan. 28, 1938　　　5 Sheets-Sheet 2
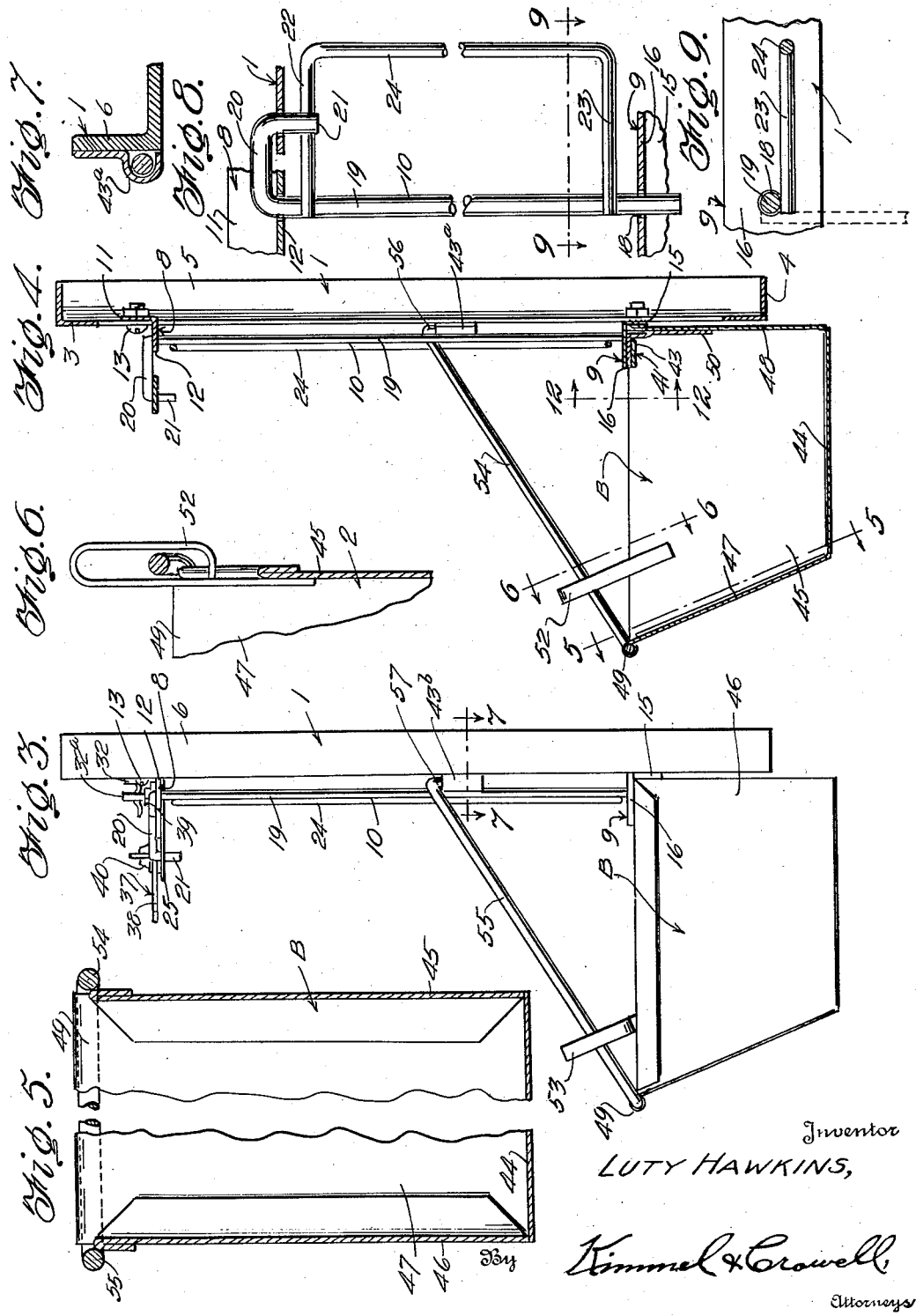
Inventor
LUTY HAWKINS,
By Kimmel & Crowell
Attorneys.

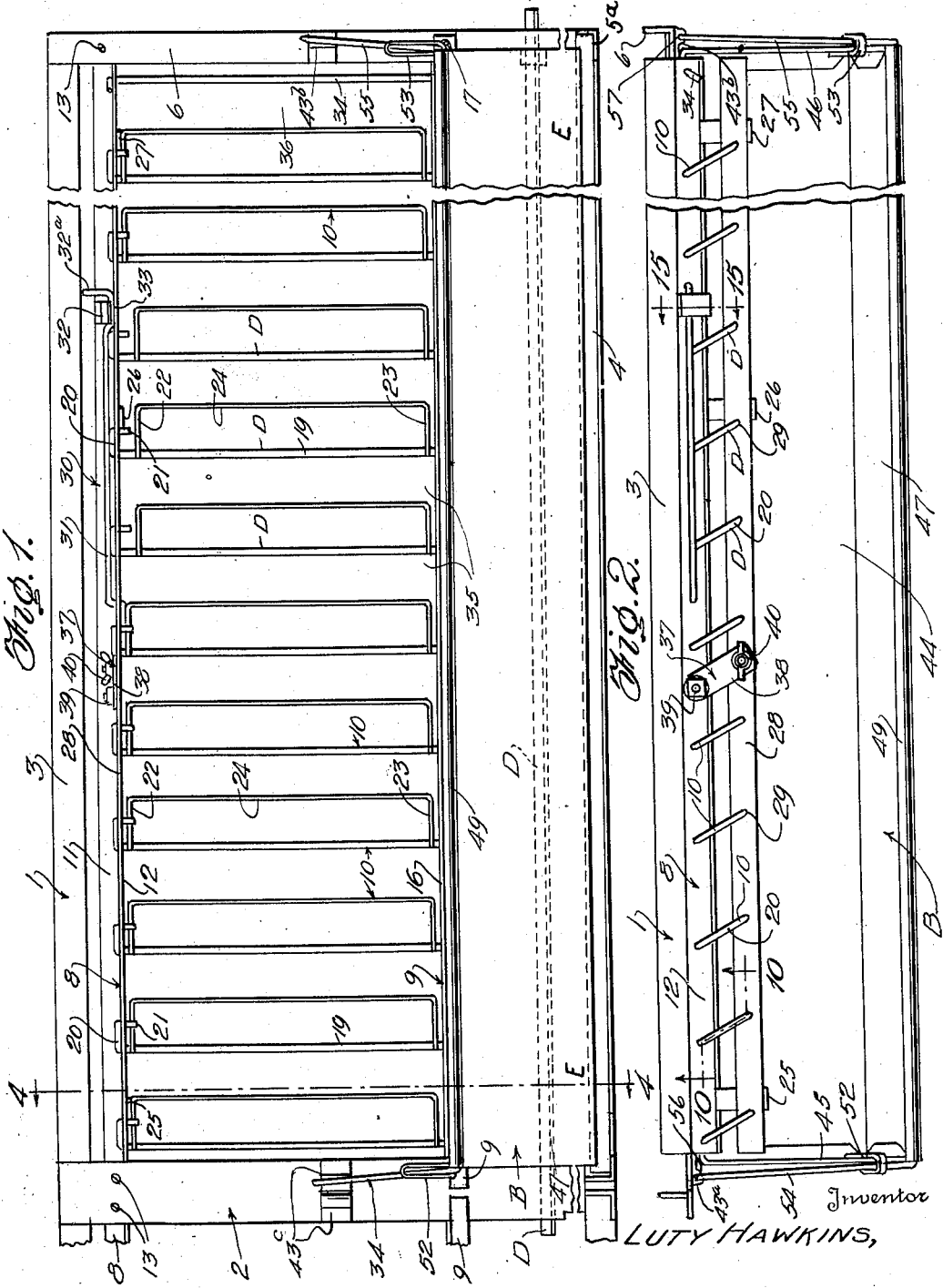

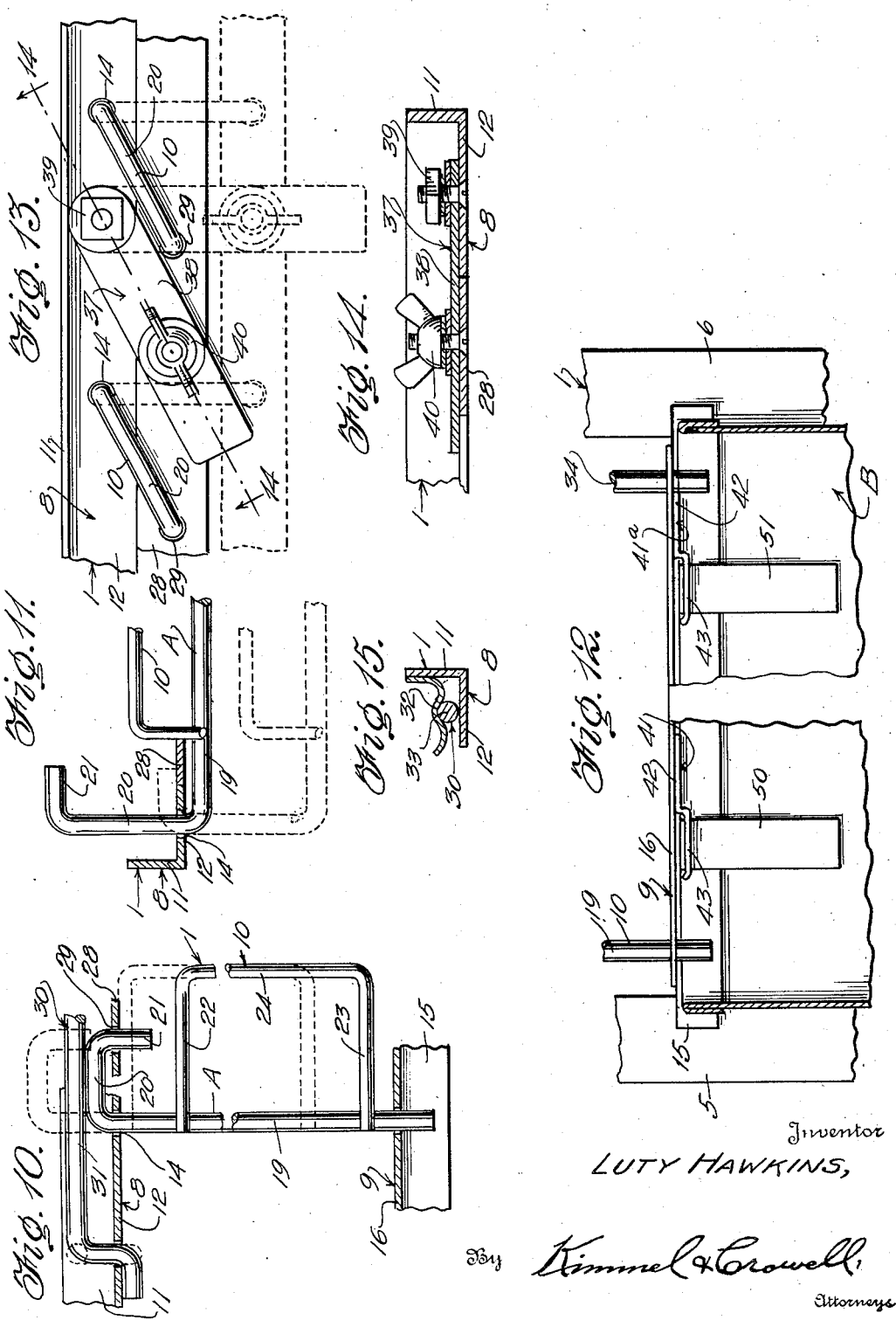

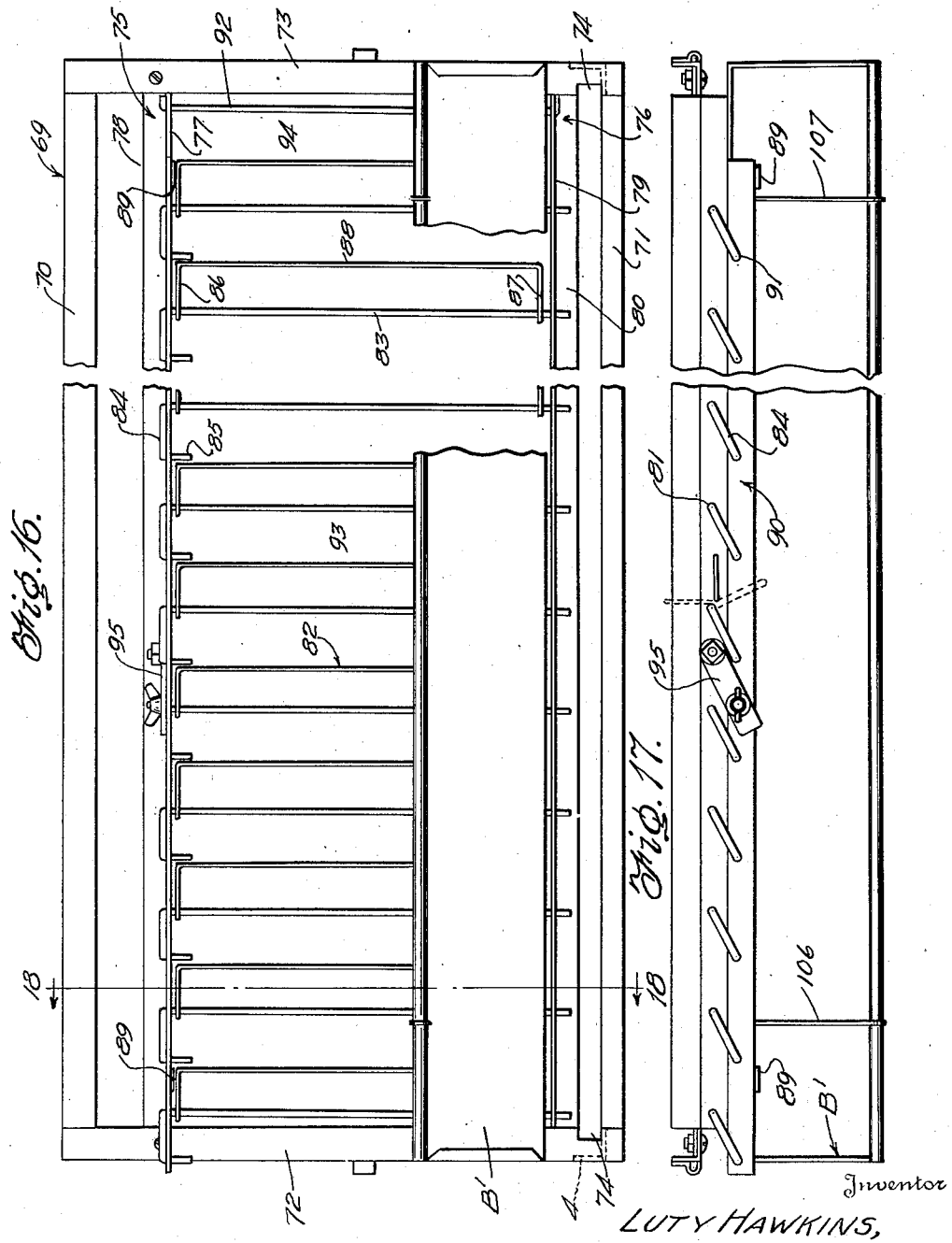

Aug. 8, 1939  L. HAWKINS  2,169,144
COMBINED CAGE AND FEEDER STRUCTURE FOR POULTRY
Filed Jan. 28, 1938  5 Sheets-Sheet 5
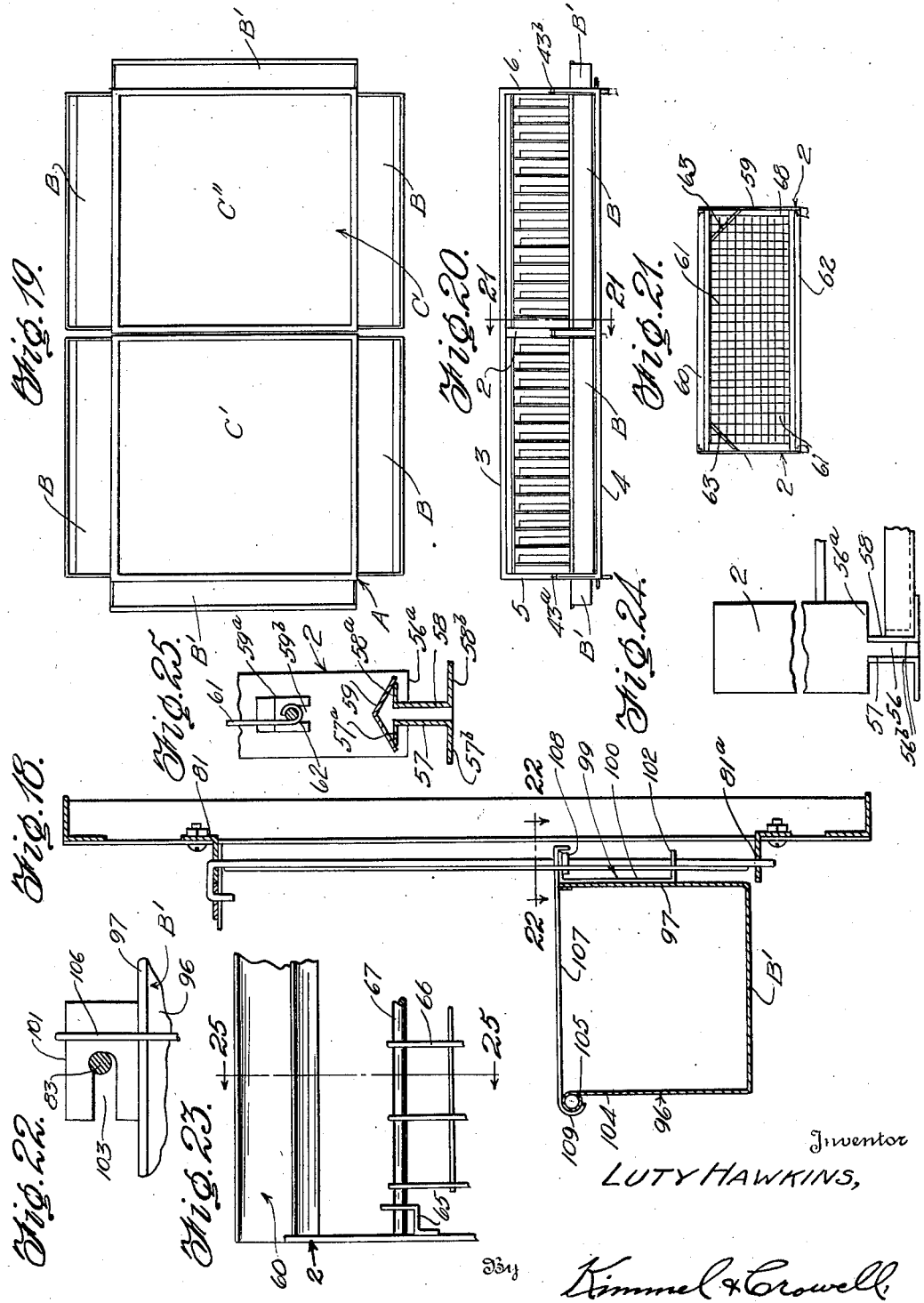
Inventor
LUTY HAWKINS,
By Kimmel & Crowell
Attorneys Patented Aug. 8, 1939

2,169,144

UNITED STATES PATENT OFFICE 2,169,144

COMBINED CAGE AND FEEDER STRUCTURE FOR POULTRY

Luty Hawkins, Mount Vernon, Ill.

Application January 28, 1938, Serial No. 187,540

16 Claims. (Cl. 119—17)

This invention relates to a combined cage and feeder structure for poultry.

The invention has for its object to provide, in a manner as hereinafter set forth, a structure of the class referred to capable of being adjusted to accommodate for the feeding of chicks of all sizes confined therein.

The invention has for its further object to provide, in a manner as hereinafter set forth, a structure of the class referred to including a cage for confining poultry and having its walls of grille-like form, and with walls of the cage including parts capable of being adjusted, when desired, to enable one to remove poultry from the cage.

A further object of the invention is to provide, in a manner as hereinafter set forth, a structure of the type referred to including a cage having its walls constructed to form openings for the passage of the heads of the poultry to the feed and means whereby variations in the size of such openings may be graduated when occasion requires.

A further object of the invention is to provide, in a manner as hereinafter set forth, a structure of the class referred to including a cage having its walls formed with adjustable openings for the passage of the heads of the fowls to the feed, means carried by the cage and incapable of being operated by the fowls whereby variations in the size of said openings may be graduated and maintained in the size to which they have been adjusted and with the said walls so formed that when the openings are adjusted for the feeding of the larger fowls, it prevents the latter from shaking their heads, which otherwise would cause an enormous loss, due to the waste of feed.

A further object of the invention is to provide, a structure of the class referred to including a cage, brooder or coop hereinafter termed a cage, and with the latter provided with means whereby passages of various sizes may be formed therein for the convenient removal therefrom of several of the birds while the others remain under a state of confinement.

A further object of the invention is to provide, in a manner as hereinafter set forth, a cage including adjustable walls of grille-like form and a holder or container for the feed disposed in extended relation with respect to and attached to said walls.

Further objects of the invention are to provide, in a manner as hereinafter set forth, a structure of the type referred to which is comparatively simple in its construction and arrangement, strong, durable, compact, adjustable, readily installed with respect to a brooder, cage or coop to form one of the walls of the latter, conveniently adjusted to form openings to permit of larger sized fowls feeding, including adjustable cage walls of grille-like form capable of being positioned in a manner to allow the removal of fowls from the cage, when desired, readily assembled and comparatively inexpensive to manufacture.

To the above ends essentially and to others which may hereinafter appear, the invention consists of the novel construction, combination and arrangement of parts to be more fully referred to and illustrated in the accompanying drawings wherein is shown an embodiment of the invention, but it is to be understood that changes, variations and modifications may be resorted to which fall within the scope of the invention as claimed.

In the drawings:

Figure 1 is a fragmentary view in front elevation and broken away of the form of the side walls of the cage with a feed container attached thereto, Figure 2 is a top plan view broken away of the structure shown in Figure 1, Figure 3 is an elevation looking towards one end of a side wall of the cage, Figure 4 is a section on line 4—4, Figure 1, Figure 5 is a section on line 5—5, Figure 4 broken away, Figure 6 is a section on line 6—6, Figure 4, Figure 7 is a section on line 7—7, Figure 3, Figure 8 is a detail partly in section and in elevation, as well as being broken away illustrating the form of the shiftable grille members and their mountings forming elements of the side walls of the cage, Figure 9 is a section on line 9—9, Figure 8, Figure 10 is a section on line 10—10, Figure 2 showing in dotted lines the first position of a shiftable grille member when shifted to form a passage for the removal of a fowl, Figure 11 is a fragmentary view in side elevation and partly in section illustrating in full lines the second position and in dotted lines the third position of a shiftable grille member when shifted to form a passage or opening for the removal of a fowl, Figure 12 is a section on line 12—12, Figure 4, Figure 13 is a fragmentary view in top plan upon an enlarged scale showing in full lines the normal or inactive position and in dotted lines the shifted or active position of the adjusting bar for the shiftable grille members of the side walls of the cage, Figure 14 is a section on line 14—14, Figure 13, and Figure 15 is a section on line 15—15, Figure 2, Figure 16 is a front elevation, broken away of the form of end walls of the cage with a feed container attached thereto, Figure 17 is a top plan view, broken away of the structure shown in Figure 16, Figure 18 is a section on line 18—18, Figure 16, Figure 19 is a diagrammatic view of the structure in plan, Figure 20 is a front elevation of the structure looking towards one side thereof and illustrating the form of the side walls with feed containers attached, Figure 21 is a section on line 21—21, Figure 20, illustrating the partition member of the cage, Figure 22 is a section on line 22—22, Figure 18, Figure 23 is a fragmentary view in side elevation, upon an enlarged scale of the partition member shown in Figure 21, Figure 24 is an end elevation, broken away and upon an enlarged scale of the partition member shown in Figure 21, and Figure 25 is a section on line 25—25, Figure 23.

The structure includes a cage in which the fowls are confined and feed containers or holders attached to and disposed in outwardly directed relation with respect to the walls of the cage. The term cage is to mean a cage, a brooder or a coop. When a single cage is used it will have as parts thereof a top and a bottom, preferably of reticulated form. The cage will be of a form whereby a series of cages may be arranged in superimposed stacked relation. When so arranged, the uppermost cage will have as parts thereof a top and a bottom and each of the lower cages will be set up only with a bottom. The bottom of the uppermost cage will form the top of the upper one of the lower cages. The bottom of a super-imposed lower cage will form the top of that cage upon which it is mounted. Each cage will include a removable drop board or pan removably supported thereby below and spaced from the bottom thereof. Each cage will be formed of a pair of compartments and a bottom element which is common to the compartments. The cage A as shown is of rectangular contour and includes a pair of side walls of like form, a pair of end walls of like form, a pair of feed containers B located at the front and rear of each compartment, a feed container B' located at the outer side of each compartment, a top element C formed of a pair of sections C', C'', each constituting the top of a compartment of cage A, an element D which is common to and forms the bottoms of the compartments, and a pair of drop boards or pans E, each being arranged below and spaced from the bottom of a compartment, and a partition forming means providing the cage A with a pair of compartments. Each side wall of the cage will include two series or sets of adjustable grille-forming members and an independent adjusting means for each of said series or sets. Each end wall of the cage will include a single series or set of adjustable grille-forming members and an adjusting means for such series.

Each side wall of cage A includes a rectangular frame 1 disposed on its lower lengthwise edge and formed of a central member 2, top and bottom members 3, 4 respectively and a pair of end members 5, 6 between which the members 3, 4 are arranged and secured preferably by welding. The frame members 3, 4, 5 and 6 will be formed of angle bars and are so shown. The lengths of the said angle bars are to be as desired. The frame member 2 is formed of a length of flat metal of the desired length and it is secured to the front faces of the bars 3, 4 preferably by welding. The members 3, 4 each include a vertical and a horizontal flange extending rearwardly from the front flange. The members 5, 6 each include an inwardly and a rearwardly extending flange. The members 3, 4 are oppositely disposed with respect to each other. The members 5, 6 are oppositely disposed with respect to each other. The vertical flanges of the members 3, 4 extend towards each other. The inwardly extending flanges of the members 5, 6 extend towards each other. The vertical flanges of the members 3, 4 are termed front flanges. The inwardly extending flanges of the members 5, 6 are termed front flanges. The members 3, 4 have their vertical flanges of less length than their rearwardly extending flanges. The end edges of the front flanges of members 3, 4 are secured, preferably by welding, to the upper end terminal portions of the inner edges of the front flanges of the members 5, 6. The end terminal portions of the rearwardly extending flanges of the members 3, 4 are secured preferably by welding to the end terminal portions of the inner faces of the flanges of the members 5, 6.

Carried by the frame 1 is a pair of spaced inner endwise aligned upper combined supporting and positioning bars 8 and a pair of spaced inner endwise aligned lower combined supporting and positioning bars 9.

The bars 8, 9 are of angle form, oppositely disposed and of a length to extend from the front flange of frame member 5 to the front flange of frame member 6. Each bar 8 is arranged below and in proximity to frame member 3 and consists of a vertical leg 11 and a horizontal leg 12. The leg 11 is of less width and of greater length than and has its bottom integral with the rear side of leg 12. The latter has its end edges arranged between and extended outwardly at right angles to a side edge of frame member 2 and the inner side edge a front flange of a frame member 5 or 6. The leg 11 extends laterally in opposite directions from the ends of leg 12 to oppose the rear face of the front flange of a frame member 5 or 6 and the rear face of the frame member 2. The end terminal portions of the leg 11 are secured against the rear face of the front flange of a frame member 5 or 6 and to the rear face of frame member 2 by a holdfast means 13. The leg 12 of each bar 8 is formed throughout lengthwise thereof with a row of spaced aligned openings 14 for a purpose to be referred to. Each bar 9 is arranged relative to the frame at a point between the longitudinal median and bottom of the frame and consists of a vertical leg 15 and a horizontal leg 16. The leg 16 is of greater width than leg 12. The leg 15 has its top formed integral with the rear of leg 16. The latter has its end edges positioned between and extended outwardly at right angles to a side edge of frame member 2 and a side edge of a frame member 5 or 6. The leg 15 extends laterally in opposite directions from the end edges of leg 16 to oppose the outer face of the frame member 2 and the outer face of the front flange of a frame member 5 or 6. The end terminal portions of the leg 15 are secured preferably by welding against the outer face of the frame member 2 and the outer face of a front flange of the frame member 5 or 6 by the holdfast means 17. The leg 16 of a bar 9 is parallel with the leg 12 of a bar 8 and is formed throughout lengthwise thereof with a row of spaced openings 18 for a purpose to be referred to. The openings 18 in leg 16 align with the openings 14 in the leg 12.

Each series of shiftable grille forming members of a side wall is arranged in a pair of outer sets and a central set. Preferably the number of grille members of the outer sets will be the same and of a number greater than the central set. Preferably the number of grille members of the central set will be three and is so shown, but such number may be increased or diminished if desired. The grille forming members of the central set are indicated at D and may be adjusted in a manner as hereinafter referred to for the purpose of providing passages or openings of a size to permit one to conveniently remove fowls from the cage. The shiftable grille forming members of each series are mounted in an upper and a lower combined supporting and positioning bar 8, 9 respectively.

Each of the shiftable grille forming members 10 consists of a vertical shaft 19 having its upper end formed with an angularly disposed horizontal part 20 which merges into a depending vertical part 21. The parts 20, 21 form the top of the shaft 19 with what may be termed a coupling extension of hook-like form. The part 20 is of greater length than the part 21. Formed integral with the shaft 19 and arranged in superposed spaced relation is a pair of horizontally disposed parts 22, 23 which at their outer ends merge into a vertical part 24. Parts 22, 23, 24 in connection with shaft 19 form the shiftable grille member with what may be termed an upstanding skeleton rectangular body. The part 22 is spaced below the upper end of shaft 19 and the part 23 is spaced above the lower end of the shaft 19. The manner in which the shiftable grille members 11 are mounted in the bars 8, 9 will be presently referred to.

Each side wall is provided with two spaced sets of three forwardly extending spaced aligned arms 25, 26, 27 which have their rear terminal portions welded or otherwise secured to the lower face of the leg 12 of a bar 8. The arms 25 and 27 are arranged in proximity to the ends of the leg 12 of the bar 8. Slidably mounted on each set of arms 25, 26 and 27 is an adjusting element 28 for the grille forming members. The member 28 is in the form of a flat bar and corresponds in length to the length of a bar 8. The element 28 is formed throughout lengthwise thereof with a series of spaced openings 29. The element 28 is arranged forwardly of and disposed in aligned spaced relation with the leg 12 of a bar 8. The openings 29 in an element 28 do not align with the openings 14 in leg 12 of a bar 8.

With respect to the mounting of each series of the shiftable grille forming members, the shafts 19 of each series are extended downwardly through the openings 14 in the leg 12 of a bar 8 and downwardly through the openings 18 in the leg 16 of a bar 9. When the shafts 19 of members 10 of the series are so mounted, the parts 23 of the members align and are arranged over and in spaced relation to the leg 16 of a bar 9 and the parts 22 are arranged below and in proximity to the leg 12 of a bar 8. The parts 20 are disposed at an angle to the parts 22, 23 positioned over and extend forwardly with respect to leg 12 of a bar 8 and arranged in angular relation to the latter. The parts 21 extend down through the openings 29 in an element 28. When the members 10 of a series are in normal position, such as shown in Figure 1, the parts 21 are disposed forwardly of parts 22 and offset with respect to shafts 19. The distance between the parts 22 and the leg 12 of a bar 8, with respect to the members 10 of the outer sets, is less than the height of the parts 21 of such members whereby the shiftable grille forming members 10 of the two outer sets of the series are permanently and loosely connected to legs 12, 16 respectively of a bar 8 and 9. The distance between the parts 22 and the leg 12 of a bar 8, with respect to the shiftable grille members D of the central set of a series is greater than the height of the parts 21 of the members D whereby these latter may be disconnected from the leg 16 of a bar 9 and swung upwardly on leg 12 of a bar 8 to form openings or passages for removing fowls from the cage. The height of the body portions of the members D of a series is less than the body portions of the other shiftable grille forming members of the series. The lower ends of the body portions of all of the shiftable grille forming members of a series are substantially in alignment. The parts 20 of all of the shiftable grille forming members of a series couple these latter to the leg 12 of a bar 8, as well as hold such members in vertical position. The lower ends of the shafts 19 of the shiftable grille members of a series couple them to the leg 16 of a bar 9. The legs 12 and 16 of the bars 8 and 9 form bearings for the shafts 19 of the grille forming members. The parts 21 of the shiftable grille forming members of a series pivotally couple them to an element 28. The parts 20, 21 of the grille members D, of a series when they are in normal position have associated therewith a shiftable latch or abutment means 30 to prevent the upward movement of members D to an extent whereby the parts 21 of members D can clear an element 28. The means 30 consists of a holder 31 pivotally mounted at one end in the leg 12 of a bar 8 and having its other end for engaging under a keeper 32 secured on the front face of leg 11 of such bar 8. The holder is of a length to extend across the top of the parts 20 of the members D. The holder 31 is formed with a finger piece 32a and a depressed part 33 which is to be positioned under the keeper 32 for releasably retaining the holder 31 in superposed relation with respect to the parts 20 of the members D.

Each grille portion of a side wall includes a vertical rod 34 anchored to one end of the legs 12, 16 of a bar 8 and its associated bar 9. The spaces 35 between the rectangular skeleton body parts of the shiftable grille-forming members of a series and the space 36 between a member 10 and rod 34 provide openings for the passage and for the confining of the necks of the fowls when feeding. The width of such openings may be simultaneously increased and the increased width graduated by swinging the members 10 of a series in a clockwise direction to any desired extent. The swinging of the members 10 is accomplished by moving an element 28 in a direction from the frame member 5 or 6 to the frame member 2, such as shown by the dotted line position of element 28, Figure 13. On swinging the element 28 in the direction aforesaid, the parts 20 of member 10 assume the dotted line showing, in Figure 13.

Each side wall includes a pair of latching means 37 for releasably retaining the elements 28 in normal and shifted positions and which also functions to releasably retain the members 10 of each series in their normal and shifted positions. Each latching means 37 (Figure 14) consists of a link 38 mounted on leg 12 of a bar 8 and on an element 28. One end of link 38 is pivotally connected with the leg 12 of the bar 8 by the coupling means 39, and the outer end of link 38 is pivotally connected with an element 28 by an adjustable coupling means 40. The latter, after the element 28 has been shifted or adjusted, acts to releasably clamp link 38 and the element 28 together to prevent the shifting of the latter and to hold the members 10 of a series in adjusted position. When an element 28 is in its non-shifted or normal position it is releasably clamped in such position by the means 40.

When it is desired to adjust the shiftable grille members D to provide an opening or passage in a side wall 1 for removing fowls from the cage, the holder 31 is removed from its engagement with a keeper 32 and swung clear of the parts 20 of members D of a series. Each of the members D is then shifted upwardly to the dotted line position shown in Figure 10 to clear leg 16 of a bar 9 and an element 28, after which the member D is turned to the full line position in Figure 11, then shifted to assume the dotted line position Figure 11 and then swung upwardly and rearwardly on leg 12 of bar 8. After the members D have been adjusted in the manner aforesaid the desired opening or passage for the removal of the fowls is provided.

Each side wall includes two spaced pairs of spaced combined suspension and coupling members 41, 41ª and each pair for association with a container B for the structure 2. The members 41, 41ª of a pair are secured to the lower face of leg 16 of a bar 9. The members 41, 41ª are of like form and each consists of a shank 42 and a combined coupling and supporting head 43. The head 43 of the member 41 is offset with respect to the outer end of the shank and such head is of U-form. The head 43 of the member 41ª is offset with respect to the inner end of the shank of such member, and is of U-form. The shanks 42 are welded to the lower face of leg 16 of a bar 9. The heads 43 have one side thereof spaced from leg 16 of bar 9 to form entrance passages for a purpose to be referred to. The leg 16 of bar 9 also provides a support for the necks of the fowls when they are feeding. The frame members 5, 6 intermediate their ends have their front flanges provided with vertically extending sockets 43ª, 43ᵇ for a purpose to be referred to. The frame member 2, intermediate its ends and on its front face is provided with a pair of spaced sidewise aligned vertically extending sockets 43ᶜ, one for coaction with socket 43ª and the other for coaction with socket 43ᵇ for a purpose to be referred to.

The containers or feed holders B which associate with the side walls of the cage are of like form and each consists of a receptacle formed of a bottom 44, a pair of side walls 45, 46, a front wall 47 inclining forwardly at an inclination from its lower to its upper end and a vertical rear wall 48. The walls and bottom of the receptacle are suitably secured together. The top of wall 47 has coextensive therewith a hollow bead 49. The wall 48 has secured to its inner face in proximity to the walls 45, 46 a pair of angle-shaped hangers 50, 51. Secured to the tops of the walls 45, 46 in proximity to the wall 47 is a pair of upstanding forwardly inclined combined retaining and stop members 52, 53 having their upper portions of loop-like form. Pivotally connected to the ends of the bead 49 is a pair of rearwardly extended combined hanger and coupling arms 54, 55. The forward ends of the said arms are disposed at an angle and extend into the ends of the bead 49 whereby said arms are pivotally connected to the bead. The arms extend rearwardly from the bead 49 and through the loop-like upper portions of the members 52, 53. The rear ends of the arms are down-turned, as at 56, 57 for removable extension into a socket 43ᶜ and a socket 43ª or 43ᵇ respectively, whereby a container is removably connected against the lower portion of and suspended from a side wall. Each container B which is associated with a side wall is also coupled with and suspended from such wall by the insertion of the upper ends of the hangers 50, 51 to seat in the heads 43 of a pair of members 41, 41ª respectively. The hangers 50, 51 are slid into the pair of members 41, 41ª respectively through the passages formed between one side of the heads 43 and leg 16 of a bar 9.

The member 4 of each side wall of the cage is arranged above the lower ends of the members 2, 5 and 6. The lower ends of the members 2, 5 and 6 align. The end members near their lower ends are cut out to form, on their inner sides seats, supports or ledges upon which the outer sides of the drop boards or pans E are slidably supported. This structural arrangement is shown by Figure 1 with respect to end member 6 and indicated at 5ª.

The central members 2 (Figures 1 and 24) have their lower end terminal portions reduced, as at 56 providing them with oppositely extending horizontal edge portions 56ª and vertically disposed parallel edge portions 56ᵇ merging at their upper ends into the inner ends of the portions 56ª. Secured against the edge portions 56ᵇ (Figure 25) and extending above the edge portions 56ª is a pair of oppositely extending channel bars 57, 58 having their upper flanges 57ª, 58ª respectively of less cross sectional width than their lower flanges 57ᵇ, 58ᵇ respectively. The bars at the end terminal portions of their tops are cut away to form clearances to provide for the bars abutting edge portions 56ª and the inner faces of the members 2. The flanges 57ᵇ, 58ᵇ form supports upon which the inner sides of the drop boards or pans E are slidably mounted. Secured to the inner faces of the members 2 and seated upon the flanges 57ª, 58ª is a cross member 59 of inverted V-shape contour. The inner faces of the members 2 above and in proximity to cross member 59 have secured thereto a pair of aligned offset keepers 59ª forming vertical notches 59ᵇ opening at the bottoms of said keepers. The upper ends of the members 2 are connected together by an angle-shaped cross piece 60. Arranged between and spaced from the members 2, as well as being spaced from the cross member 59 and cross piece 60 is an upstanding reticulated panel 61 having its bottom in the form of a bar 62 of a length to engage in the keepers 59ª whereby the panel 61 is coupled with the members 2. Secured to the cross piece 60 and to the members 2 are oppositely disposed inclined brace bars 63 which are suitably secured to the panel 61 and in connection with the latches 59ª maintain the panel 61 vertical. The channel bars 57, 58, cross member 59, and panel 61 coact to form a vertically disposed partition arranged within cage to provide the latter with a pair of compartments.

The end walls of cage A are of like form and oppositely disposed. Each end wall consists of a frame 69 formed of a top member 70, a bottom member 71 and a pair of sides 72, 73 which are provided by the rearwardly extending flanges of the side members 5, 6 of the frames 1. The members 70, 71 of frame 69 are constructed and arranged relative to the frame sides 72, 73 in the same manner as the frame members 3, 4 of the frames 1 are constructed and arranged with respect to the frame 5, 6 of the frames 1.

The members 5, 6 are formed near their lower ends with oppositely disposed inwardly opening notches 74, only one shown relative to member 6. These notches 74 coact with the members 4 for slidably supporting the element D which provides the bottoms of the compartments of the cage.

Carried by the frame 69 of each end wall are upper and lower angle-shaped combined supporting and positioning bars 75, 76 respectively. The bars 75, 76 are of the same form as the bars 8, 9 respectively. The bars 75, 76 extend from the frame side 72 to the frame side 73 and are secured to said sides. The bar 75 is arranged below frame member 70 and its legs are designated 77, 78 and correspond in form and arrangement as the legs 11, 12 of a bar 8. The bar 78 is arranged a greater distance below the frame member 70 than the distance a bar 8 is arranged below the frame member 3. The bar 76 is arranged a smaller distance above the frame member 71 than the distance between a bar 9 and frame member 4. The legs of bar 76 are designated 79, 80 and correspond in form and arrangement as the legs 15, 16 respectively of a bar 9. The leg 77 of bar 75 aligns with the leg 79 of the bar 76. The leg 77 of bar 75 is formed throughout with a row of spaced aligned openings 81. The leg 79 of bar 76 is formed throughout with a row of spaced aligned openings 81ª which align with the openings 81 (Figure 18). The bars 75, 76 are disposed on opposite sides of the longitudinal median of the frame 69.

The series of shiftable grille-forming members 82 of an end wall are so mounted and arranged that when shifted for adjustment with respect to such end wall they extend into the cage, that is to say they are shifted inwardly with respect to the frame 69 anti-clockwise, whereas each series of grille-forming members 10 of a side wall when shifted for adjustment with respect to such side wall extend outwardly with respect to the cage, that is to say they are shifted outwardly with respect to a frame 1 clockwise. The members 82 are of greater length than the members 10. Each of the grille-forming members 82 consists of a vertical shaft 83 having its upper end formed with an angularly disposed horizontal part 84 which merges into a depending vertical part 85. The parts 84, 85 form the top of shaft 83. The part 84 is of greater length than part 85. Secured to the shaft 83 is a pair of horizontally disposed parts 86, 87 which at their outer ends merge into a vertical part 88. The parts 86, 87, 88, in connection with shaft 83 form the grille member 82 with what may be termed an upstanring rectangular skeleton part. The part 86 is spaced below the upper end of shaft 83 and the part 87 is spaced above the lower end of shaft 83. The manner in which the grille members 82 are mounted in the bars 75, 76 will be presently referred to.

Each end wall includes a set of spaced forwardly extending aligned arms 89 which have their rear terminal portions welded or otherwise secured to the lower face of the leg 77 of the bar 75. Slidably mounted on the arms 89 is an adjusting element 90 for the grille members 82 and which is in the form of a flat bar corresponding in length to the length of bar 75. The element 90 is formed throughout with a series of spaced aligned openings 91. The element 90 is arranged forwardly of and positioned against the front side edge of the leg 77 of bar 75. The openings 91 in element 90 are disposed to the left of openings 81 in leg 77 when element 90 is in normal position. Element 90 when in normal position extends beyond the left end of leg 77 (Figures 16 and 17).

With respect to the mounting of the series of grille-forming members 82 for each end wall, the shafts 83 of the series are extended downwardly through the openings 81 in the leg 77 of bar 75 and downwardly through the openings 81ª in the leg 79 of bar 76. When the shafts 83 are so mounted the parts 87 of the members align and are arranged over and in close spaced relation to the leg 79 of bar 76 and the parts 88 of the members are arranged below and in close spaced relation to the leg 77 of bar 75. The parts 84 are disposed at an angle to the parts 87, 88, positioned over and extend forwardly with respect to the leg 77 of bar 75 and normally arranged in angular relation with respect to the latter. The parts 85 extend down through the openings 91 in the element 90.

Each end wall includes a vertical rod 92 anchored to one end of the leg 77 of a bar 75 and the leg 79 of a bar 76. The spaces 93 between the rectangular skeleton parts of the members 82 and the space 94 between a member 82 and the rod 92 form openings for the passage for and for confining the necks of the fowls when feeding. The width of such openings may be varied and the increased width graduated by swinging the members 82 inwardly into the cage in an anti-clockwise direction to any desired extent. The swinging or adjusting of the members 82 is accomplished by moving the element 90 from its normal position in a direction from the side 72 of frame 69 to the side 73 of the latter.

Each end wall includes a latching means 95 for releasably retaining the element 90 in normal and shifted position. The means 95 is of the same form as the latching means 39 and mounted and arranged with respect to element 90 in a like manner as the means 37 is disposed with respect to an element 28. The means 95 operates in the same manner as the means 37.

The feed containers or holders B' for the end walls are of like form and each consists of an open top troughlike body 96 of oblong contour having secured to the outer face of its rear wall 97 a pair of spaced parallel upstanding attaching elements 98, 99. Each attaching element consists of a vertical strap-like part 100 formed at its ends with rearwardly extending superposed flanges 101, 102 formed transversely thereof with substantially key hole shaped slots 103 which open at a side edge of the flanges. The slots 103 extend in the same direction. The front wall 104 of body 96 at its upper end is formed throughout with a circular bead 105. Each container B' is detachably connected to an end wall of the cage and for such purpose the elements 98, 99, a pair of spaced suspension bars 106, 107 and a pair of spaced collars 108 are employed. The bars 106, 107 are positioned on the top edge of wall 97 and have their forward ends in the form of circular hooks 109 for engaging around the bead 105. The rear end terminal portions of the bars 106, 107 are seated upon and secured to the flanges 101 of the elements 98, 99 respectively adjacent the slots 103 in flanges 101. The collars 108, 109 are anchored on the shafts 83 of a pair of spaced grille-forming members 82. The flanges 101 of the elements 98, 99 are mounted on the collars 108. The slots 103 form passages for the pair of shafts 83 aforesaid and also permit of the mounting of the elements 98, 99 upon the collars. The container or holder B' when detachably connected to and disposed in suspended relation with respect to an end wall of the cage is arranged above the bar 76.

Each compartment of the cage has an inner end wall provided by the partition, an outer end wall provided by an end wall of the cage, and a pair of side walls, each provided by a grille portion of a side wall of the cage. One of the sections of the top of the cage provides the top of a compartment.

What I claim is:

1. A combined cage and feeder structure for poultry including a wall having a grille forming a part thereof, and an open top feed holder arranged at the front of the grille, said grille including spaced shiftable grille members normally coacting to form therebetween openings for the passage of the heads of small fowls to the feed in the holder, said wall including means connected to and through which said members extend for shifting the members in unison on their vertical axes to graduate the size of said openings for the passage of the heads of large fowls to the feed, and said wall including means coacting with the said other means for releasably holding said grille members from movement in adjusted and normal positions.

2. A combined cage and feeder structure including a wall having a grille-forming part thereof, and an open top feed holder arranged at the lower portion of the front of the grille, said grille including spaced shiftable grille members coacting to form openings for the passage of the heads of small fowls to the feed in the feed holder, said wall including means for shifting said members simultaneously on their vertical axes to graduate the size of said openings for the passage of the heads of large fowls to the feed, said wall including means for releasably holding said grille members from movement in adjusted and normal positions, and said wall and one terminal portion of certain of said members having coacting parts to provide for the adjusting of such members relative to said shifting means to form a passage or opening for the removal of the fowls from the cage.

3. A combined cage and feed structure for poultry including a wall having a grille forming a part thereof, and a feed holder, said grille including a pair of spaced parallel combined supporting and positioning bars, a pair of parallel side parts and spaced grille members carried by one of said bars, extending through the other bar, arranged between said side parts and coacting to form openings for the passage of the heads of fowls to the feed in the feed holder, said feed holder being positioned against the lower portion of the front of the grille, below the said other bar, the latter one of said bars and said feed holder having coacting means for supporting the holder and for coupling the holder and grille together, the coacting means on said feed holder being carried by the rear thereof, and the front of said side parts and the sides of said holder having coacting means for suspending said holder relative to said grille.

4. A combined cage and feed structure for poultry including a wall having a grille forming a part thereof, and an open top feed holder arranged at the front of the grille, said grille including spaced shiftable grille members coacting to form openings for the passage of the heads of small fowls to the feed in the feed holding structure, said wall including means for shifting said members on their vertical axes to graduate the size of said openings for the passage of the heads of large fowls to the feed, said wall including means for releasably holding the grille members from movement in adjusted and normal positions, said wall and one terminal portion of certain of said members having coacting parts to provide for the adjusting of said members relative to said shifting means to form a passage or opening for the removal of the fowls from the cage, and said wall including means for retaining the said certain of the grille members in their coacting relation with respect to the other grille members to form the openings for the passage of the head of a fowl.

5. In a combined cage and feeder structure for poultry including a wall having as parts thereof a frame and a grille, said grille including upper and lower spaced combined supporting and positioning bars secured to said frame adjacent the top and bottom of the latter, grille members pivotally mounted in said bars, arranged in spaced relation and coacting to form openings for the passage of the heads of small fowls to feed disposed in front of the grille structure, means connected with and supported from one of said bars and connected to the grille members for shifting the latter to graduate the size of said openings for the passage of the heads of larger fowls to the feed, and means connected to the said bar and to said shiftable means for holding the grille members in adjusted and normal positions.

6. A combined cage and feeder structure for poultry including a wall having as a part thereof a grille, and an open top feed holder arranged at the front of the grille, said grille including spaced shiftable grille members coacting to form openings for the passage of the heads of small fowls to the feed in the feed holder, said wall and grille including means for shifting said members to graduate the size of said openings for the passage of the heads of large fowls to the feed, said means and grille including means for releasably holding said grille members from movement in adjusted and normal positions, said grille members being arranged in a pair of outer sets and a central set, the grille members of said outer sets being permanently connected with said wall, the grille members of said central set being capable of being detached at one end from said wall and swung outwardly, forwardly and rearwardly with relation to the other ends thereof to form an opening or passage for the removal of the fowls from the cage, and means carried by said wall for releasably retaining the grille members of the central set in their coacting relation with the grille members of the other sets when forming the openings for the passage of the heads of the fowls to the feed.

7. In a combined cage and feed structure for poultry, a wall, a grille forming a part of said wall, and a feed holder arranged at the lower portion of the front of the grille, said grille including spaced simultaneously horizontally adjustable grille members formed intermediate their ends and lengthwise thereof with offset skeleton parts coacting to provide between said members openings of selected uniform widths for the passage of the heads of fowls to the feed in the feed holder, said wall and feed holder having coacting means at the sides thereof for suspending the feed holder below the grille, and said grille and holder including coacting means for coupling and suspending the feed holder to and from the grille.

8. In a combined cage and feeder structure for poultry, a wall of the cage including a frame, a pair of superposed spaced combined supporting and positioning bars formed lengthwise thereof with aligned spaced openings, said bars being connected to the sides of the frame, spaced grille members arranged between said bars and each including a shaft extending through the aligned openings of said bars and having its upper end formed with a coupling extension, each of said grille members including a skeleton part integral with the shaft and arranged between and spaced from said bars, a slidable adjusting element for said grille members provided lengthwise with spaced openings, the coupling extensions of said members being loosely extended into the openings in said element, supporting means for said element extending forwardly of said upper bar, and means carried by said upper bar and element for holding said grille members in adjusted position.

9. In a combined cage and feeder structure for poultry, a wall of the cage having as a part thereof an upstanding frame, upper and lower combined supporting and positioning bars fixed to the frame, a series of grille members arranged in a pair of outer sets and a central set, said sets being pivotally connected to said bars, simultaneously horizontally adjustable and having offset portions intermediate their ends arranged between said bars, the said portions of said sets coacting to provide openings for the passage of the heads of fowls to feed, said sets when adjusted varying the size of said openings, the said portions of the outer sets being of a length for permanently connecting the grille members of said outer sets to said bars, the said portions of the grille members of the central set being of a length to permit the grille members of the central set to be detached from the lower bar and swung upwardly on the upper bar, and coacting means carried by said upper bar for releasably securing the grille members of the central set to said upper and lower bars.

10. In a combined cage and feeder structure for poultry, a cage wall having as a part thereof an upstanding frame, upper and lower spaced superposed combined supporting and positioning bars secured to the frame, spaced skeleton members, each including a portion arranged between said bars and a shaft pivotally mounted in said bars, said members coacting to form openings for the passage of the heads of small fowls to feed, a slidable adjusting element supported from the upper bar and connected with said shafts for shifting said members to graduate the size of said openings for the passage of the heads of large fowls to the feed, and means carried by the upper bar and said element for holding said members in adjusted and normal positions.

11. In a combined cage and feeder structure for poultry, a cage wall having as a part thereof an upstanding frame, upper and lower spaced superposed combined supporting and positioning bars secured to the frame, spaced skeleton members, each including a portion arranged between said bars and a shaft pivotally mounted in said bars, said members coacting to form openings for the passage of the heads of small fowls to feed, a shiftable adjusting element connected with said shafts for shifting said members to graduate the size of said openings for the passage of the heads of large fowls to the feed, means carried by the upper bar and said element for holding said members in adjusted and normal positions, a feed holder arranged forwardly of said frame, said lower bar and rear of said holder having coacting means for coupling the holder to and for suspending the holder relative to the frame, and the sides of said frame and the sides of said holder having coacting means for suspending the holder from the frame.

12. In a combined cage and feeder structure for poultry, a cage wall having as a part thereof a frame including top, bottom and side members, a pair of superposed spaced intermediate members, one arranged in proximity to the top member, the other arranged between the longitudinal median of the frame and said bottom member, said intermediate members formed lengthwise thereof with spaced aligned openings, supporting means extending forwardly of the upper intermediate member, an adjusting element slidably mounted on said supporting means and provided lengthwise thereof with spaced openings non-aligned with the openings in said intermediate members, shafts pivotally mounted in the openings in said intermediate members and each having its upper end formed with a coupling extension extending into an opening of said element, skeleton parts of less length than and having their ends connected with said shafts, said skeleton parts arranged between said intermediate members, said shafts arranged in a pair of outer sets and a central set, the skeleton parts of said sets coacting to form openings for the passage of the heads of small fowls to feed, said element capable of shifting said shafts to provide for said skeleton parts graduating the size of said openings for the passage of the heads of large fowls to the feed, and means for holding said element in normal and adjusted positions.

13. The structure as set forth in claim 12 having the shafts of the outer sets being permanently connected to said intermediate members, the shafts of the central set capable of being removed from the lower intermediate member and swung outwardly, upwardly and rearwardly with respect to the upper intermediate member to form an opening or passage for the removal of the fowls, and releasable means carried by the upper intermediate member for normally holding the central set of shafts from upward movement.

14. In a combined cage and feed structure for poultry, a wall, a grille forming a part of said wall, and a feed holder arranged at the lower portion of the front of the grille, said grille including spaced simultaneously adjustable pivotally supported vertical grille members formed intermediate their ends with offset parts to provide between said members continuous vertical openings of selected uniform widths for the passage of the heads of fowls to the feed in the feed holder, said wall, grille and feed holder having coacting means for detachably connecting the holder to and for suspending the holder from the front of the grille.

15. A combined cage and feeder structure for poultry comprising a cage including a pair of side walls, a pair of end walls and a partition dividing the cage into a pair of compartments, each compartment including a pair of side walls and an outer end wall, a feed holder at the front of the outer end wall and side walls of each compartment, each side wall and outer end wall of each compartment having as a part thereof a set of upstanding, spaced, pivotally supported, simultaneously adjustable grille members formed intermediate their ends and lengthwise thereof with offset portions coacting to normally provide between said members openings for the passage of the heads of small fowls to a holder, and means for simultaneously adjusting the members of the set on a wall whereby the offset portions of the members of such set will simultaneously and uniformly increase the width of the openings between the members in such wall for the passage of the heads of larger fowls to the holder.

16. A combined cage and feeder structure for poultry comprising a cage including a pair of side walls, a pair of end walls and a partition dividing the cage into a pair of compartments, each compartment including a pair of side walls and an outer end wall, said partition providing an inner end wall common to said compartment, a feed holder suspended from the front of the outer end wall of each compartment, said outer end wall of each compartment having as a part thereof a set of upstanding, spaced, pivotally supported, simultaneously adjustable grille members formed intermediate their ends and lengthwise thereof with offset portions coacting to normally provide between said members openings for the passage of the heads of small fowls to the holder at the front of such wall, the latter being provided with means for shifting said members anti-clockwise whereby the offset portions of the members of such set will simultaneously and uniformly increase the width of the openings in such wall for the passage of the heads of larger fowls to the holder at the front of such wall.

LUTY HAWKINS.